Dec. 2, 1952  J. H. KARCHMER  2,620,361
METHOD OF CONVERTING HYDROCARBONS IN THE PRESENCE
OF A STABILIZED PHOSPHORIC ACID CATALYST
Filed Dec. 9, 1949
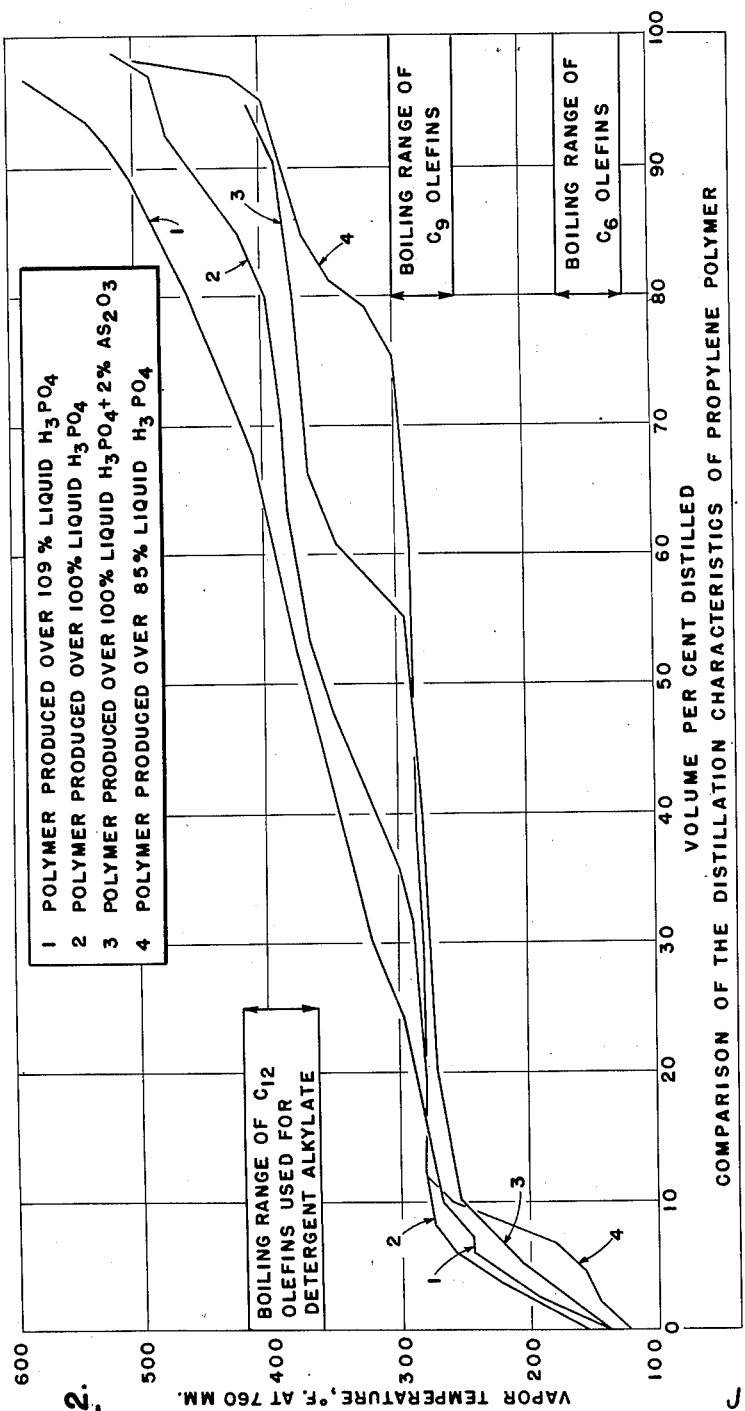
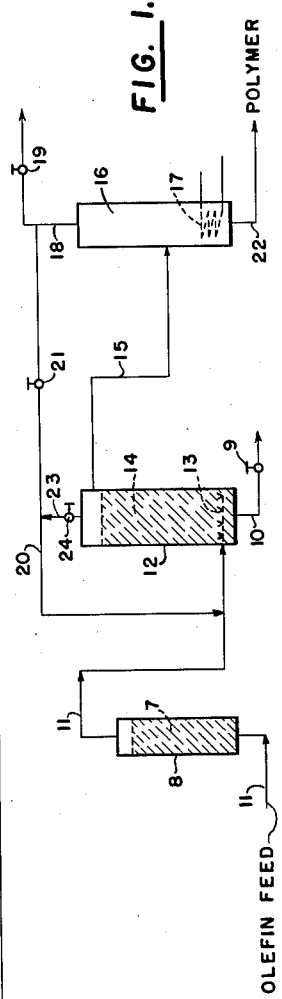
INVENTOR.
Jean H. Karchmer,
BY
AGENT.

Patented Dec. 2, 1952

2,620,361

UNITED STATES PATENT OFFICE 2,620,361

METHOD OF CONVERTING HYDROCARBONS IN THE PRESENCE OF A STABILIZED PHOSPHORIC ACID CATALYST

Jean H. Karchmer, Baytown, Tex., assignor, by mesne assignments, to Standard Oil Development Company, Elizabeth, N. J., a corporation of Delaware Application December 9, 1949, Serial No. 131,966

18 Claims. (Cl. 260—671)

The present invention is directed to a process for polymerizing olefins. More particularly the invention is directed to polymerization of olefins employing a liquid phosphoric acid catalyst.

Prior to the present invention it has been known to use liquid phosphoric acid polymerization catalysts. For example, Holm et al., U. S. Patent 2,186,021, described in detail a liquid phosphoric acid catalyst and the corrosive nature thereof. Holm et al.'s solution to the problem was to employ a liquid catalyst of phosphoric acid deposited on an inert material such as quartz chips, the liquid phosphoric acid trickling downward over the quartz. This process, while effective in polymerizing olefins, also suffered from the disadvantages of the extreme corrosivity of the phosphoric acid in the bottom of the vessel where the liquid acid collected.

Ipatieff has taught the employment of liquid phosphoric acid conversion catalyst which contains salts of various metals in his U. S. Patent 2,060,871. Keunecke et al. have also made a similar teaching in their U. S. Patent 2,300,123. The salts of the metals suggested by these prior art workers include salts of aluminum, zinc, cadmium, mercury, iron, nickel, cobalt, copper, magnesium, silver, thorium, barium and potassium. The main purpose of adding these salts was to increase the yield of the product or to increase the life of the catalyst.

While the prior art processes as exemplified by the foregoing patents have been employed commercially, they have suffered from the disadvantages enumerated before and the industry, rather than use a liquid phosphoric acid, has turned to a supported type of phosphoric acid wherein the acid is adsorbed in and on a porous support and therefore is not corrosive to ferrous metals employed in the various polymerization processes.

It is therefore the main object of the present invention to provide an improved polymerization process using a liquid phosphoric acid catalyst.

Another object of the present invention is to provide a polymerization process in which a liquid phosphoric acid is employed and in which the catalytic activity of the phosphoric acid is stabilized.

A still further object of the present invention is to provide a process in which a liquid phosphoric acid catalyst is employed whose activity is substantially enhanced.

The objects of the present invention may be achieved by contacting an olefin-containing hydrocarbon stream with a liquid phosphoric acid catalyst selected from the class consisting of ortho and pyrophosphoric acid at a reaction temperature and pressure, the catalyst having added to it a stabilizing amount of a stabilizing agent selected from the oxides and metals of the elements below phosphorus in the right-hand column of group V of the periodic table (Periodic Chart of the Atoms, revised edition, 1947, designed by Henry D. Hubbard, published by W. M. Welch Manufacturing Co., Chicago, Illinois).

The present invention, therefore, may be described briefly as involving polymerization of an olefin such as a mono-olefin having from 2 to 6 carbon atoms in the molecule by contacting a stream containing the olefin with a liquid phosphoric acid catalyst at a temperature in the range from 280° to 600° F. and at a pressure in the range from atmospheric to 7000 p. s. i. g., the liquid phosphoric acid catalyst being selected from the class consisting of ortho and pyrophosphoric acid to which has been added a small amount of a stabilizing agent, in the range from about 0.2 to about 10% by weight of the phosphoric acid, selected from the class consisting of the oxides and metals of the elements below phosphorus in the right-hand column of group V of the periodic table.

The stabilizing agents employed in the practice of the present invention, as mentioned before, will be added to the phosphoric acid catalyst selected from the class consisting of ortho and pyrophosphoric acids in an amount in the range between 0.2 and 10% by weight based on the phosphoric acid. A preferable amount will be in the range from about 0.2 to 5% by weight. Actually, 0.3% by weight of the stabilizing agent will be preferred for best results. Amounts less than 0.2% by weight are largely ineffective for the purposes of the present invention.

The stabilizing agents will include the oxides and metals of the elements below phosphorus in the right-hand column of group V of the periodic table and may be exemplified by arsenic, antimony and bismuth, and the oxides thereof, such as for example, arsenic oxide, bismuth oxide and antimony oxide. Arsenious acid may also be employed. The ortho and pyrophosphoric acids employed in the practice of the present invention may be present in the liquid catalyst in an amount in the range between 75 to 115% $H_3PO_4$. Liquid phosphoric acid catalysts having concentrations between 85 and 109% $H_3PO_4$ have been found to give beneficial results.

The temperatures employed in the practice of the present invention may range from 280° to about 600° F. It has been found that the presence of the stabilizing agent confers activity on the catalyst and allows lower temperatures to be employed. Thus, phosphoric acids which ordinarily would require a temperature in the range from about 350 to 400° F. may be employed to polymerize olefins at temperatures as low as 280° F. A preferred temperature range is from 300 to 500° F.

Pressures employed in the practice of the present invention may range from atmospheric up to about 7000 p. s. i. g., with a preferred range from about 300 to 500 p. s. i. g. Increasing the pressure results in increased contact times and increases the yields to a remarkable extent. For example, at pressures around 300 to 500 p. s. i. g. 100% yield of polymer may be obtained.

The olefin-containing feed stock may be employed in either the liquid or the vapor phase and it may contact the liquid phosphoric acid in any suitable mixing device. One way of contacting the olefin with the liquid phosphoric acid catalyst is by forming a pool or column of the liquid phosphoric acid catalyst and allowing the olefin feed to bubble upwardly through the pool or column of liquid catalyst through suitable jets. It is also possible to contact the olefin-containing stream with the liquid phosphoric acid in suitable contact towers such as towers equipped with bell cap trays and other contacting means. By virtue of the stabilizing effect of the stabilizing agents added to the liquid phosphoric catalyst, it is possible to use conventional contacting equipment such as bell cap trays universally employed in the petroleum industry and it is unnecessary to resort to inert contacting means such as quartz, although it is within the purview of my invention to employ contacting materials such as carbon Berl saddles, Raschig rings, other ceramic packing, and any of the conventional distribution means employed in the industry having a low silica content. Glass and other materials containing a high precentage of silica are undesirable as the stabilized phosphoric acids react therewith and gradually dissolve them. It is also possible to contact the olefin-containing stream with the liquid phosphoric acid catalyst by resorting to incorporating devices, centrifugal pumps, stirring and other mixing devices available to the art. The only requirement as to the contacting device is that it should allow intimate contact between the liquid catalyst and an olefin containing stream such that polymerization of the olefin is effected.

The olefins forming the feed stock of the present invention will include the olefins containing from two to about six carbon atoms in the molecule and may be exemplified by ethylene propylene, the butylenes, pentylenes and hexylenes. Similarly, the diolefins having from four to six carbon atoms may also be employed in the practice of the present invention. Illustrative members of the diolefins that may be used as feed stocks are butadiene, pentadienes, isoprene and the hexadienes. When ethylene forms a portion of the feed stock it should be employed in admixture with another olefin having a greater number of carbon atoms since efforts to polymerize ethylene alone have been largely unsuccessful in that low yields were obtained. It is contemplated that the olefin feed stock of the present invention may be used in the pure state or in admixture with other olefins or other hydrocarbons. For example, propylene is a preferred feed stock and it is usually obtained in the petroleum refinery in admixture with eth- ylene, propane, and possibly some butylenes and butadiene. Thus, while the pure hydrocarbon will be the preferred feed stock, it is within the spirit and scope of my invention to use mixtures of the various olefins.

The invention will be further illustrated by reference to the drawing in which—

Fig. 1 is a flow diagram of a preferred mode of practicing the invention.

Fig. 2 is a plot showing the distillation characteristics of propylene polymer produced by contacting propylene with liquid phosphoric acid catalysts of varying strengths as compared to the distillation characteristics of a polymer produced in accordance with the present invention.

Referring now to the drawing, numeral 11 designates a charge line through which an olefin feed such as a propylene-containing stream is admitted from a source not shown. Line 11 discharges the propylene-containing stream into contacting tower 12 through distributing jets 13 which allow the propylene-containing stream to bubble upwardly through a pool of liquid phosphoric acid catalyst 14 indicated by the shaded portion.

Since water is removed continuously by the hydrocarbon stream bubbling through the liquid phosphoric acid catalyst in reactor 14, it is desirable to include in feed line 11 a water saturation drum 8 containing water indicated by the shaded portion 7. As an alternative to water saturator 8 water could be injected directly into the reactor with the feed or by a separate line thereto. The amount of liquid phosphoric acid catalyst, which may be ortho or pyrophosphoric acid having a strength in the range given, will be sufficient to give a contact time whereby polymerization is effected at the temperature employed. The reacted product leaves contacting tower 12 through line 15 which discharges it into a distillation zone 16 which is provided with a heating means illustrated by steam coil 17 whereby temperature and pressure conditions may be adjusted to cause removal of unreacted hydrocarbon from the polymer formed in contacting tower 12. It will be understood that distillation zone 16 may be provided with suitable internal contacting equipment whereby intimate contact between liquids and vapors is effected. Usually distillation zone 16 will contain bell cap plates as ordinarily employed in the petroleum industry.

Line 18 is provided to remove unreacted hydrocarbons overhead from tower 16. It will be desirable to discard a portion of the unreacted hydrocarbons from the system by opening valve 19 to prevent build up of paraffin hydrocarbons which may be present in the feed stream. However, it will be desirable to recycle a large portion of the unreacted hydrocarbons to line 11 by way of line 20 controlled by valve 21 so that the valuable olefinic hydrocarbons will not be lost to a great extent.

The polymer produced in contact tower 12 is withdrawn from distillation zone 16 by line 22 for further processing and treating or for use as a gasoline blending agent. Ordinarily the polypropylene polymer produced in this operation may, after hydrogenation or alkylation, be employed in aviation gasoline or it may be employed to make an alkylated aromatic which is suitable for sulfonation for production of detergents.

Since some of the unreacted hydrocarbon vapors leaving reactor 14 may separate therein from the liquid product, it is desirable to provide line 23 controlled by valve 24 which will allow the unreacted mono-olefins to be withdrawn from reactor 14 and charged directly into line 20 for recycling to the process.

The phosphoric acid employed in tower 12 is preferably ortho phosphoric acid containing arsenic trioxide as $As_2O_3$ in an amount in the range from about 0.2 to 10% by weight and a preferred amount in the range from 0.3 to 5% by weight. This catalyst will be introduced to contacting tower 12 by line 10 controlled by valve 9 at the start of a run and ordinarily need not be removed until the end of the run. However, it is contemplated that if the catalyst should lose its activity or become fouled by formation of carbonaceous bodies or for any reason whatsoever, a portion of the catalyst in tower 12 may be withdrawn and replaced by a fresh amount of catalyst using line 10 for both withdrawing and replacing the catalyst.

It is to be understood that some phosphoric acid may be carried out of reactor 12 entrained with the product in line 15 and it may be desirable to provide a catch pot in line 15 to recover this acid and to prevent it from being discharged into distillation zone 16. As an alternative to a catch pot to separate entrained phosphoric acid, it may be more desirable to neutralize the product by contacting it with an alkaline solution such as an aqueous alkaline solution of sodium hydroxide prior to the polymer being introduced into zone 16.

The present invention produces unusual results in that the catalytic effect of phosphoric acid catalyst is limited to ortho and pyrophosphoric acids, the meta phosphoric acid having relatively little catalytic activity to polymerize olefins as compared with ortho and pyrophosphoric acids. Also, phosphoric acid in the presence of iron such as encountered in reaction vessels and the like is converted to meta phosphoric acid at a temperature of about 300° F. In the absence of iron this takes place only above 600° F. Thus it will be seen that in the prior art processes employment of ferrous metal containers resulted in the ortho phosphoric acid being rapidly converted to the inactive form. In the practice of the present invention with a phosphoric acid catalyst containing a stabilizing agent of the type mentioned before, catalyst deterioration does not take place because the stabilizing agent stabilizes the ortho phosphoric acid to this form of the acid without conversion to the inactive form.

Another unusual effect of the stabilizing agent added to the catalyst is that it changes the distribution of the product causing an increasing proportion of the lower molecular weight compounds to be formed as increasing amounts of the stabilizing agents are used. Thus, when employing 0.5% arsenic trioxide and propylene as the feed stock, the product distribution is substantially the same as without arsenic. With 2% arsenic trioxide, considerably more polymer containing 9 carbon atoms in the molecule and less polymer containing 12 carbon atoms is formed when polymerizing propylene. This is highly desirable when the process is operated for maximum gasoline production.

On the other hand, when it is desired to produce a product which is suitable for alkylation with an aromatic for detergent manufacture, a lower amount of the stabilizing agent should be employed and only that amount which would be necessary to stabilize the catalyst and to prevent the catalyst from corroding the iron vessel.

In order to illustrate the invention further reference will be made to the following examples: 400 parts of 85% ortho phosphoric acid containing 7.6 parts by weight of arsenic oxide ($As_2O_3$) were added to a vessel and heated to 500° F. until 60 parts of water were removed. The catalyst was substantially 100% $H_3PO_4$ containing 2.25% $As_2O_3$. The catalyst was then transferred to a reactor having iron and glass walls and into which was jetted a stream containing 58% by volume of propylene. On operating at a temperature of 380° F. and pressure of 480 p. s. i. g. a polymer was obtained.

A similar catalyst was prepared with the exception that arsenic was not added to the catalyst. The catalyst was heated to remove the same amount of water and placed in a similar reactor and propylene feed stock was jetted therein, temperatures employed ranging from 375 to 400° F. at a pressure of 470 p. s. i. g.; the amount of polymer obtained was less than $\frac{1}{10}$ of that obtained in the run where arsenic was present. It was found that the phosphoric acid catalyst which contained arsenic corroded iron to only a negligible extent whereas the phosphoric acid without arsenic was very corrosive to iron.

The foregoing runs show that polymerization with 100% ortho phosphoric acid was unsuccessful when arsenic was absent in that the ortho phosphoric acid was rapidly converted at temperatures of 375 to 400° F. to metaphosphoric acid in the presence of an iron vessel.

Runs were then made charging a propylene-containing stream containing 89% propylene to contact with a catalyst comprising 100% ortho phosphoric acid and containing 2.25% arsenic trioxide. A temperature of 360° F. and a pressure of 400 to 600 p. s. i. g. was maintained on the system. The olefin conversion yield was 97%.

This run shows that substantially complete conversion may be obtained when the ortho phosphoric acid is stabilized with the stabilizing agent in accordance with the present invention.

An additional run has been made in which a propylene-containing stream was contacted with a liquid 100% phosphoric acid catalyst to which 10% by weight of arsenious oxide had been added. The propylene-containing stream was contacted with the catalyst at an average temperature of 456° F. and at a maximum pressure of 560 pounds per square inch. A polymer was obtained of which 5% distilled at 278° F. and 95% distilled at 460° F. The distillation characteristics of the polymer, as compared to one obtained with 100% phosphoric acid to which no arsenic oxide has been added, indicate that the polymer contained a larger proportion of hydrocarbons of low molecular weight than that obtained by the catalyst of the prior art.

In order to illustrate this feature further runs were made with 109% liquid phosphoric acid ($H_3PO_4$), 100% liquid phosphoric acid, 100% liquid phosphoric acid plus 2% arsenic trioxide and with 85% liquid phosphoric acid, employing propylene as the feed stock. Temperatures employed in these runs were about 360° F. and pressures were maintained at about 500 pounds per square inch. The propylene feed stock contained 58% by volume propylene. The results of these runs are plotted graphically in the Figure 2 which shows that the polymer produced by contacting propylene with liquid phosphoric acid to which arsenic trioxide has been added is substantially different in characteristics to that produced over liquid phosphoric acid of the same strength without arsenic trioxide. In short, the data show that the presence of the arsenic trioxide modified the characteristics of the polymer such that the polymer produced when employing 100% phosphoric acid containing 2% arsenic trioxide is more like the polymer produced with 85% phosphoric acid than that produced over 100% phosphoric acid to which arsenic trioxide had not been added. It is apparent from these data that the characteristics of the polymer may be modified by adding varying amounts of arsenic trioxide to the catalyst.

A still further run was made in which a liquid phosphoric acid catalyst was employed which contained 109% H3PO4 to which had been added 2% of arsenic trioxide. A feed containing 89% by volume of propylene was contacted with this catalyst at a temperature of 295° F. and a pressure of 400 pounds per square inch. A polymer yield of 97½ was obtained.

The present invention has been described and claimed with respect to polymerizing olefins. It is to be understood, of course, that the invention is not to be restricted to polymerization processes, but may be employed in alkylation of olefins with isoparaffins. In such reactions an isoparaffin in excess of olefin in a mixture is contacted with the liquid phosphoric acid containing a stabilizing agent under suitable conditions of temperature and pressure as mentioned before with respect to polymerization to form a product comprising an isoparaffin having a greater number of carbon atoms than the isoparaffin feed stock.

The olefins employed as alkylating agents will include the olefins enumerated before. The isoparaffins may include isobutane, isopentane, and other paraffins such as hexanes, heptanes, octanes, and nonanes, whose molecules contain a tertiary hydrogen atom.

The present invention may also be employed in the alkylation of aromatics with olefins. In such reactions, an excess of an alkylatable aromatic hydrocarbon, such as benzene, toluene, xylene, or the like, is contacted with an olefin in the presence of liquid phosphoric acid containing a stabilizing agent under suitable conditions of temperature and pressure as mentioned before with respect to polymerization, to form an alkylated aromatic hydrocarbon. The olefins employed as alkylating agents will include the olefins enumerated before, as well as olefins of higher molecular weight, such for instance, as those having nine to twelve carbon atoms.

In the specification and claims, the strength of the catalyst expressed in "per cent phosphoric acid" is calculated as ortho phosphoric acid ($H_3PO_4$) based on the following equation:

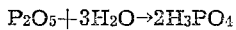

$$P_2O_5 + 3H_2O \rightarrow 2H_3PO_4$$

The percent of $P_2O_5$ in any catalyst will allow determination of the strength of catalyst and "per cent phosphoric acid."

The nature and objects of the present invention having been completely described and illustrated, what I wish to claim as new and useful and to secure by Letters Patent is:

1. A catalytic conversion process selected from the group consisting of alkylation and polymerization which comprises contacting an olefin-containing hydrocarbon feed at a reaction temperature in the range between 280° and 600° F. and at a pressure at least atmospheric with a liquid catalyst comprising a phosphoric acid selected from the class consisting of ortho and pyro phosphoric acid and a stabilizing amount of a stabilizing agent in the range between 0.2% and 10% by weight based on the phosphoric acid selected from the class consisting of oxides of the metals below phosphorus in the right-hand column of group V of the periodic table.

2. A process in accordance with claim 1 in which the reaction temperature is in the range between 280° and 600° F.

3. A process in accordance with claim 1 in which the olefin-containing hydrocarbon comprises a mixture of isoparaffin and olefin in which the isoparaffin is in excess of the olefin.

4. A process in accordance with claim 1 in which the convertible hydrocarbon is a monoolefin.

5. A method for alkylating an isoparaffin and olefin at a reaction temperature and pressure which comprises forming a mixture of an isoparaffin having from 4 to 8 carbon atoms in the molecule with a mono-olefin having from 2 to 6 carbon atoms in the molecule, the isoparaffin being in excess of the monoolefin, contacting the mixture at a temperature in the range from 280° F. to 600° F. and at a pressure in the range from atmospheric to 7000 p. s. i. g. with a liquid catalyst comprising a phosphoric acid selected from the class consisting of ortho and pyro phosphoric acid and a small amount in the range between 0.2% and 10% by weight based on the phosphoric acid of a stabilizing agent selected from the class consisting of the oxides of the metals below phosphorus in the right-hand column of Group V of the periodic table.

6. A method for alkylating an alkylatable hydrocarbon which comprises forming a feed mixture of an alkylatable hydrocarbon having from 4 to 8 carbon atoms in the molecule and a monoolefin having from 2 to 12 carbon atoms in the molecule, contacting the mixture at a temperature in the range from 280° F. to 600° F. and at a pressure at least atmospheric with a liquid catalyst comprising a phosphoric acid selected from the class consisting of ortho and pyrophosphoric acid and a stabilizing amount of a stabilizing agent in the range between 0.2% by weight based on the phosphoric acid selected from the class consisting of the oxides of the metals below phosphorus in the right-hand column of group V of the periodic table.

7. A method in accordance with claim 6 in which the alkylatable hydrocarbon is an isoparaffin having from 4 to 8 carbon atoms in the molecule.

8. A method in accordance with claim 6 in which the alkylatable hydrocarbon is an aromatic hydrocarbon having from 6 to 8 carbon atoms in the molecule.

9. A polymerization process which comprises contacting an olefin at a reaction temperature in the range between 280° and 600° F. and at a pressure at least atmospheric with a liquid catalyst comprising a phosphoric acid selected from the class consisting of ortho and pyrophosphoric acid and a stabilizing amount of a stabilizing agent in the range between 0.2% and 10% by weight based on the phosphoric acid selected from the class consisting of the oxides of the metals below phosphorus in the right-hand column of group V of the periodic table.

10. A process in accordance with claim 9 in which the reaction temperature is in the range between 280° and 600° F.

11. A process in accordance with claim 9 in which the stabilizing agent is arsenic trioxide.

12. A process in accordance with claim 9 in which the stabilizing agent is bismuth oxide.

13. A process in accordance with claim 9 in which the stabilizing agent is antimony oxide.

14. A polymerization process which comprises contacting an olefin having from 2 to 6 carbon atoms in the molecule at a temperature in the range from 280° to 600° F. and at a pressure in the range from atmospheric to 7000 p. s. i. g. with a liquid catalyst comprising a phosphoric acid selected from the class consisting of ortho and pyrophosphoric acid and a small amount in the range between 0.2% and 10% by weight based on the phosphoric acid of a stabilizing agent selected from the class consisting of the oxides of the metals below phosphorus in the right-hand column of group V of the periodic table.

15. A process in accordance with claim 14 in which the stabilizing agent is arsenic trioxide.

16. A process in accordance with claim 14 in which the stabilizing agent is bismuth oxide.

17. A process in accordance with claim 14 in which the stabilizing agent is antimony oxide.

18. A polymerization process which comprises contacting a propylene-containing stream at a temperature of approximately 350° F. and at a pressure from about 300 to about 500 p. s. i. g. with a liquid catalyst comprising a phosphoric acid selected from the class consisting of ortho and pyrophosphoric acid and 0.3% by weight based on the phosphoric acid of a stabilizing agent selected from the class consisting of the oxides of the metals below phosphorus in the right-hand column of group V of the periodic table.

JEAN H. KARCHMER.

REFERENCES CITED

The following references are of record in the file of this patent:

UNITED STATES PATENTS

| Number | Name | Date |
|---|---|---|
| 2,204,194 | Stahly et al. | June 11, 1940 |
| 2,396,486 | Ballard | Mar. 12, 1946 |
| 2,431,715 | Wachter | Dec. 2, 1947 |

FOREIGN PATENTS

| Number | Country | Date |
|---|---|---|
| 517,799 | Great Britain | Feb. 8, 1940 |

OTHER REFERENCES

Rohrman, Corrosion of Metals by Phosphoric Acids, Chem. and Met. Eng., vol. 42, No. 7, July 1935, pp. 368–9.